(12) United States Patent
Iwashita et al.

(10) Patent No.: US 7,401,492 B2
(45) Date of Patent: Jul. 22, 2008

(54) CONTROL DEVICE FOR A DIE CUSHION MECHANISM

(75) Inventors: Yasusuke Iwashita, Yamanashi (JP);
Tadashi Okita, Yamanashi (JP);
Hiroyuki Kawamura, Yamanashi (JP);
Satoshi Ikai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 53 days.

(21) Appl. No.: 11/470,510

(22) Filed: Sep. 6, 2006

(65) Prior Publication Data

US 2007/0051155 A1 Mar. 8, 2007

(30) Foreign Application Priority Data

Sep. 7, 2005 (JP) .............................. 2005-259263

(51) Int. Cl.
*B21J 9/18* (2006.01)
(52) U.S. Cl. ..................... 72/454; 72/20.1; 72/20.3; 72/443
(58) Field of Classification Search .................. 72/17.2, 72/20.1, 20.2, 20.3, 21.6, 351, 443, 454; 318/560, 571, 568.18
See application file for complete search history.

(56) References Cited

U.S. PATENT DOCUMENTS

| | | | | |
|---|---|---|---|---|
| 5,435,166 A | * | 7/1995 | Sunada ......................... | 72/351 |
| 6,843,647 B2 | * | 1/2005 | Fujita et al. ................. | 425/589 |
| 7,049,775 B2 | * | 5/2006 | Iwashita et al. ............. | 318/566 |
| 7,069,847 B2 | * | 7/2006 | Teraoka ....................... | 100/35 |
| 7,287,409 B2 | * | 10/2007 | Shiroza et al. ............... | 72/351 |
| 7,293,447 B2 | * | 11/2007 | Iwashita et al. .............. | 72/454 |

FOREIGN PATENT DOCUMENTS

| | | |
|---|---|---|
| JP | 8025100 A | 1/1996 |
| JP | 10202327 A | 8/1998 |

OTHER PUBLICATIONS

Notice of Reasons for Rejection of Patent Application No. 2005-259263 mailed Sep. 18, 2007.

* cited by examiner

*Primary Examiner*—Ed Tolan
(74) *Attorney, Agent, or Firm*—Lowe, Hauptman, Ham & Berner, LLP

(57) ABSTRACT

A control device (10) for a die cushion mechanism that produces a force for a slide (24) in a press machine, comprising slide velocity command-forming means (61) for forming a velocity command for the slide (24), die cushion velocity command-forming means (62) for forming a velocity command for said die cushion (20), and velocity relation calculation means (65) for calculating a velocity relation between the velocity of the slide and the velocity of the die cushion based on a rate of increase (dF) in the force produced between the slide and the die cushion immediately after the collision of the slide with the die cushion. The cushion velocity command-forming means forms the velocity command for the die cushion based upon the slide velocity command formed by the slide velocity command-forming means and upon the velocity relation calculated by the velocity relation-calculation means. This makes it possible to form an optimum velocity command for the slide and/or the die cushion.

5 Claims, 6 Drawing Sheets

Fig.3a $va$ | $Cvb_{11}$   $Cvb_{12}$   ............   $Cvb_{1n}$
     | $Cvb_{21}$                                    ⋮
     |    ⋮
     | $Cvb_{m1}$   ......................   $Cvb_{mn}$
     |_____ $dF$

Fig.3b $vb$ | $Cva_{11}$   $Cva_{12}$   ............   $Cva_{1n}$
     | $Cva_{21}$                                    ⋮
     |    ⋮
     | $Cva_{m1}$   ......................   $Cva_{mn}$
     |_____ $dF$

Fig. 6

| dF | (Cva, Cvb) |
|---|---|
| $dF_1$ | $(Cva_1, Cvb_1)$ |
| ⋮ | ⋮ |
| $dF_n$ | $(Cva_n, Cvb_n)$ |

# CONTROL DEVICE FOR A DIE CUSHION MECHANISM

BACKGROUND OF THE INVENTION

1. Field of the Invention

The present invention relates to a control device for a die cushion mechanism.

2. Description of the Related Art

In a press machine for effecting press-work such as bending, drawing or punching, it is a known practice to install a die cushion mechanism as an accessory unit for applying a predetermined force (pressure), from the side of a support member (usually called bolster) that supports a second mold to a movable support member (usually called slide) that supports a first mold used for the press-work, during the machining operation. The die cushion mechanism is usually so constituted that a cushion pad moves together with a slide while applying a force (pressure) to the slide after the slide (or the first mold) moving in a direction of closing the mold is brought into direct or indirect collision with a moving element (called cushion pad) held with a predetermined pressure until when the mold is opened after the mold is closed (molding). During this period, the peripheral region of a working portion of a workpiece is held between the cushion pad and the slide to prevent the occurrence of wrinkles on the workpiece.

The die cushion mechanism is operated by a control device. The control device produces an instruction related to the velocity of the die cushion mechanism and an instruction related to the velocity of the slide. The die cushion mechanism and the slide are driven based on these instructions (see, for example, Japanese Patent Application No. 2005-195097).

However, the above conventional control device forms the instruction related to the velocity of the die cushion without referring to any reference for judgement. When the velocity command that is produced for the die cushion mechanism is relatively small, therefore, the relative velocity between the die cushion and the slide becomes relatively great. As a result, the slide comes into collision with the die cushion at a relatively large velocity and produces large noise on collision. In this case, further, a relatively large impact acts on the first and second molds causing their life to be shortened.

In order to suppress the noise and the impact, therefore, it can be considered to decrease the relative velocity between the die cushion and the slide. In this case, however, though the noise can be suppressed, as a pressure acting on the workpiece from the first and second molds is decreased, and it is possible that the workpiece is not worked to a sufficient degree.

It is therefore desired to obtain an optimum velocity for the die cushion to suppress the noise while favorably working the workpiece. From the same reason, further, it is desired to obtain an optimum velocity for the slide.

The present invention was accomplished in view of the above circumstances, and has an object of providing a control device capable of forming an optimum velocity command for the die cushion and/or an optimum velocity command for the slide.

SUMMARY OF THE INVENTION

In order to achieve the above object, according to a first aspect, there is provided a control device for a die cushion mechanism that produces a force for a slide in a press machine using servo motors as a drive source, comprising:

slide velocity command-forming means for forming a velocity command for the slide;

die cushion velocity command-forming means for forming a velocity command for the die cushion; and velocity relation calculation means for calculating a velocity relation between the velocity of the slide and the velocity of the die cushion based on a rate of increase in the force produced between the slide and the die cushion immediately after the collision of the slide with the die cushion;

wherein the die cushion velocity command-forming means forms the velocity command for the die cushion based upon the slide velocity command formed by the slide velocity command-forming means and upon the velocity relation calculated by the velocity relation-calculation means.

In the first aspect, as a relationship between the velocity of the slide and the velocity of the die cushion is used, it is possible to form an optimum velocity command for the die cushion. Use of the velocity command for the die cushion makes it possible to suppress the noise of collision and the breakage of the mold while preventing the workpiece being defectively worked.

According to a second aspect, there is provided a control device for a die cushion mechanism that produces a force for a slide in a press machine using servo motors as a drive source, comprising:

slide velocity command-forming means for forming a velocity command for the slide;

die cushion velocity command-forming means for forming a velocity command for the die cushion; and velocity relation calculation means for calculating a velocity relation between the velocity of the slide and the velocity of the die cushion based on a rate of increase in the force produced between the slide and the die cushion immediately after the collision of the slide with the die cushion;

wherein the slide velocity command-forming means forms the velocity command for the slide based upon the die cushion velocity command formed by the die cushion velocity command-forming means and upon the velocity relation calculated by the velocity relation-calculation means.

In the second aspect, as a relationship between the velocity of the slide and the velocity of the die cushion is used, it is possible to form an optimum velocity command for the slide. Use of the velocity command for the slide makes it possible to suppress the noise of collision and the breakage of the mold while preventing the workpiece being defectively worked.

According to a third aspect, there is provided a control device for a die cushion mechanism that produces a force for a slide in a press machine using servo motors as a drive source, comprising:

slide velocity command-forming means for forming a velocity command for the slide;

die cushion velocity command-forming means for forming a velocity command for the die cushion; and velocity relation calculation means for calculating a velocity relation between the velocity of the slide and the velocity of the die cushion based on a rate of increase in the force produced between the slide and the die cushion immediately after the collision of the slide with the die cushion;

wherein the slide velocity command-forming means and the die cushion velocity command-forming means, respectively, form the velocity command for the slide and the velocity command for the die cushion based upon the velocity relation calculated by the velocity relation-calculation means.

In the third aspect, as a relationship between the velocity of the slide and the velocity of the die cushion is used, it is possible to form an optimum velocity command for the slide and an optimum velocity command for the die cushion. Use of the velocity commands for the slide and for the die cushion makes it possible to suppress the noise of collision and the breakage of the mold while preventing the workpiece being defectively worked.

A fourth aspect is concerned with any one of the first to third embodiments, wherein the velocity relation calculation means calculates the velocity relation by utilizing a restitution coefficient between the slide and the die cushion.

That is, according to the fourth aspect, the velocity command for the slide and/or the velocity command for the die cushion can be easily formed by a relatively easy constitution.

A fifth aspect is concerned with any one of the first to fourth embodiments, and further includes input means for inputting the rate of increase in the force produced between the slide and the die cushion.

That is, the fifth aspect makes it possible to easily input the rate of increase in the force requested by the operator.

The above objects, features and advantages, as well as other objects, features and advantages of the invention, will become obvious from the detailed description of the typical embodiments of the invention shown in the accompanying drawings.

BRIEF DESCRIPTION OF THE DRAWINGS

FIG. 3a is a diagram showing a map of die cushion velocity command values Cvb;

FIG. 3b is a diagram showing a map of slide velocity command values Cva;

FIG. 6 is a diagram showing a map of slide velocity command values Cva and die cushion velocity command values Cvb.

DETAILED DESCRIPTION

Figure 1:
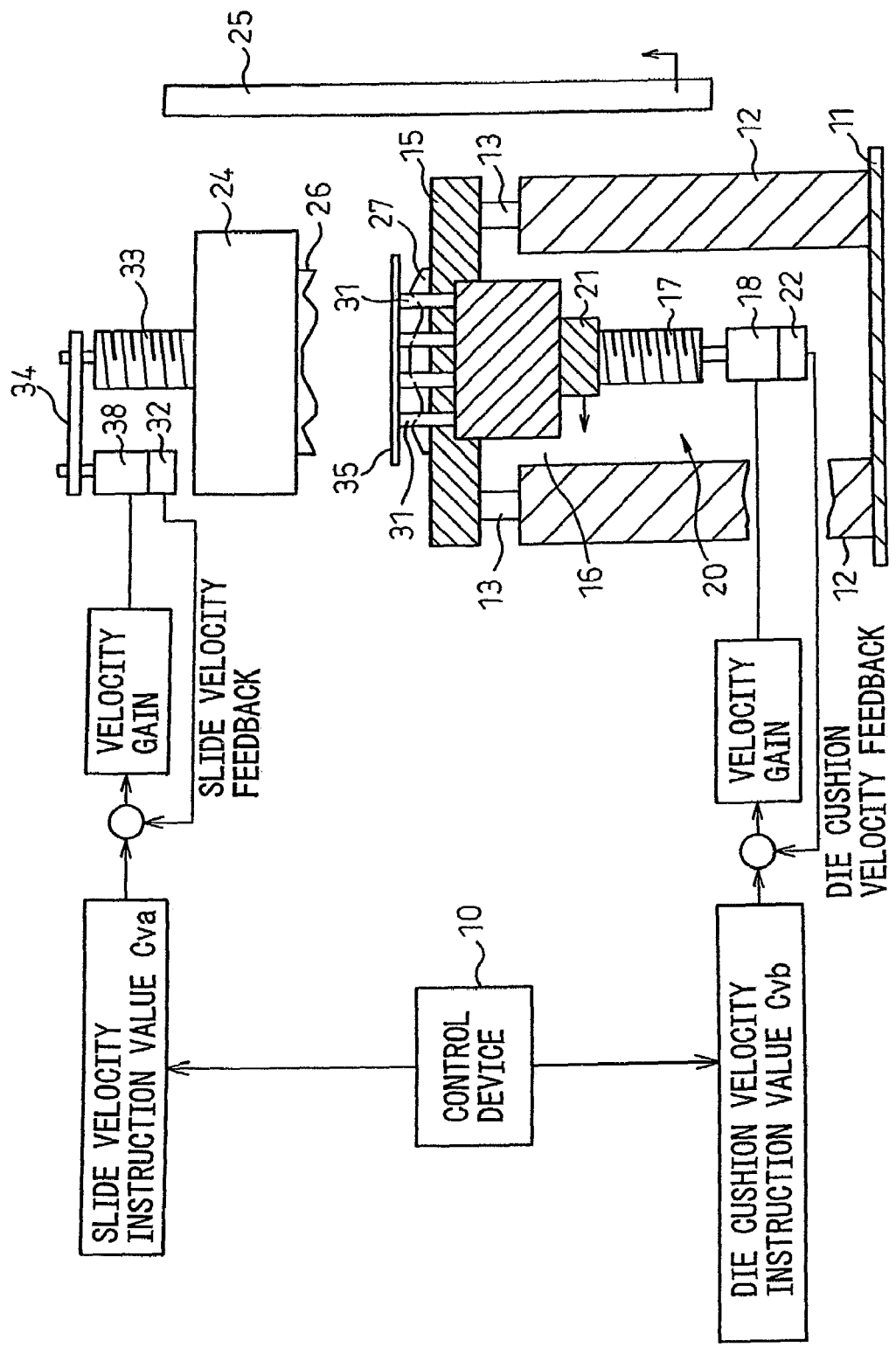
FIG. 1 is a view schematically illustrating a basic constitution of a die cushion mechanism in a press machine equipped with a control device according to the present invention.

Embodiments of the invention will now be described with reference to the accompanying drawings. In the drawings, the same members are denoted by the same reference numerals. For ease of understanding, the scale is suitably changed in the drawings.

FIG. 1 is a view schematically illustrating a basic constitution of a die cushion mechanism 20 in a press machine including a control device 10 according to the present invention, wherein the press machine is opened. As shown in FIG. 1, two support portions 12 extend in a vertical direction from a base 11, and a bolster 15 of the shape of a flat plate is arranged at the ends of the support portions 12 via dampers 13. In FIG. 1, a die cushion mechanism 20 is provided under the bolster 15.

A slide 24 is supporting a first mold 26 used for the press work. A ball-screw device 33 is coupled to the slide 24 on the side opposite to the side of supporting the first mold 26. The ball-screw device 33 is coupled to a first servo motor 38 via a belt/pulley device 34. Due to this mechanism, the slide 24 moves in a direction to approach, or separate away from, a second mold 27 supported by the bolster 15 at a velocity V required for the press work.

The die cushion mechanism 20 according to the present invention includes a cushion pad 16 that slides in a direction perpendicular to the lower surface of the bolster 15 accompanying the operation of the slide 24, and a second servo motor 18 for lifting and lowering the cushion pad 16. A plurality of cushion pins 31 extends beyond the top surface of the cushion pad 16 and protrudes beyond the bolster 15 through the holes in the bolster 15. A workpiece 35 is supported at the ends of the cushion pins 31.

The cushion pad 16 is arranged in relation to the second mold 27, and is connected to the output shaft of the servo motor 18 via a ball-screw device 17. The slide 24 (or the first mold 26), during moving in a direction to close the mold, comes into direct or indirect collision with the cushion pad 16 that is standing by at a predetermined position. Usually, the cushion pad 16 is so constituted as to move together with the slide 24 while applying a predetermined force (pressure) F to the slide 24 from when the mold is closed (molding) until the mold is opened. In this specification, the cushion pad 16 and the member related thereto are called a die cushion for convenience.

The above operation is conducted by the control device 10 for the press machine based on the present invention. The operation of the press machine will now be concretely described with reference to FIG. 1. When the press machine is in operation, the control device 10 forms a slide velocity command value Cva which is, then, multiplied by a predetermined velocity gain and is fed to the first servo motor 38. Therefore, the first servo motor 38 rotates and the slide 24 is lowered.

Accordingly, the first mold 26 pushes down the plurality of cushion pins 31 via the workpiece 35. Therefore, the cushion pad 16 is pushed downward.

The control device 10 further forms a die cushion velocity command value Cvb which is, then, multiplied by a predetermined velocity gain and is fed to the second servo motor 18. In response to the downward motion of the cushion pad 16, therefore, the second servo motor 18 rotates to similarly lower the bolster 15. As the force (pressure) acting on the cushion pad 16 increases, the cushion pins 31 are further lowered, and the workpiece 35 is press-worked being held between the first mold 26 of the slide 24 and the second mold 27 of the bolster 15. Here, the bolster 15 is slightly lowered by the slide 24. Next, after having arrived at the bottom dead center, the slide 24 starts rising, and the other members, too, return back to their initial positions to end the press work.

Thus, the control device 10 produces a correlative pressure (i.e., force F) between the cushion pad 16 and the slide 24 by controlling the first servo motor 38 and the second servo motor 18. As can be seen from FIG. 1, a force detection unit 21 for detecting the pressure (i.e., force F) is connected to the control device 10. Similarly, a velocity detection unit 32 that detects the rotational velocity of the first servo motor 38 as a velocity of the slide 24 and a velocity detection unit 22 that detects the rotational velocity of the second servo motor 18 as a velocity of the die cushion, too, are connected to the control device 10. As can be seen from FIG. 1, the velocity detection units 22 and 32 are used to conduct the feedback control the slide velocity va and the die cushion velocity vb.

As shown in FIG. 1, a position detection unit 25 is arranged neighboring the support portion 12, and is connected to the control device 10. The force detection unit 21 may be a known force sensor, the velocity detection units 22 and 23 may be known encoders, and the position detection unit 25 may be a known linear scale or a rotary encoder.

Figure 2:
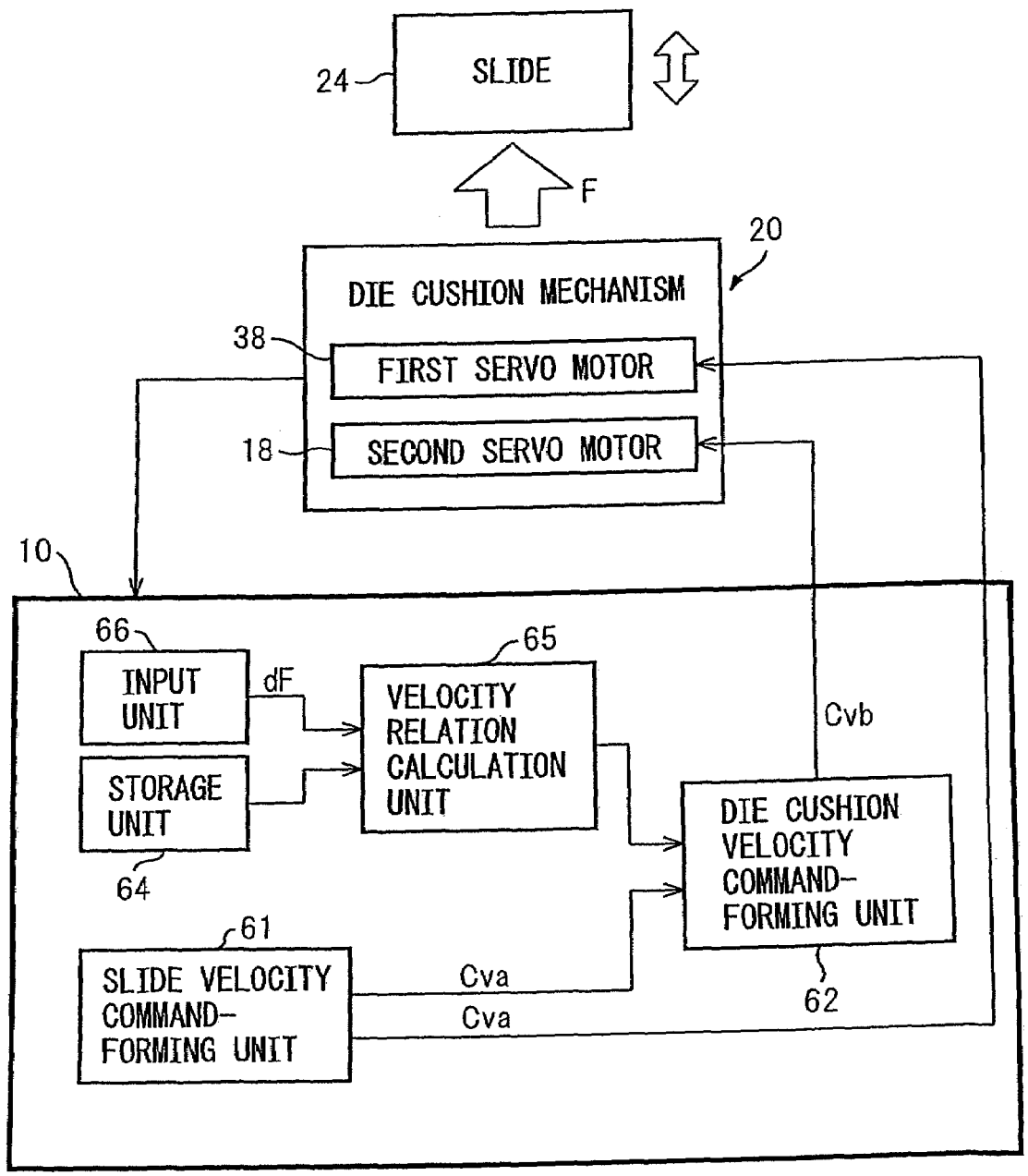
FIG. 2 is a functional block diagram illustrating the control device for the die cushion mechanism according to a first embodiment of the present invention.

FIG. 2 is a functional block diagram illustrating the control device for the die cushion mechanism according to a first embodiment of the present invention. As shown in FIG. 2, the control device 10 based on the first embodiment includes a slide velocity command-forming unit 61 for forming a velocity command Cva for the slide 24, and a die cushion velocity command-forming unit 62 for forming a velocity command Cvb for the die cushion 20. The control device 10 is further equipped with an input unit 66. The input unit 66 may be a keyboard or a mouse. The operator of the control device 10 can easily input, through the input unit 66, a rate of increase dF in the force F produced between the slide 24 and the die cushion 20 immediately after the collision of the slide 24 with the die cushion 20.

The control device 10 further includes a storage unit 64 for storing reference values and various data, such as a mass Ma of the slide 24, a mass Mb of the die cushion 20, and a restitution coefficient e at the time of collision of the slide 24 with the die cushion 20. As shown, the input unit 66 and the storage unit 64 are connected to a velocity relation calculation unit 65 in the control device 10.

The velocity relation calculation unit 65 calculates a velocity relation between the velocity of the slide 24 and the velocity of the die cushion 20. The velocity relation calculated by the velocity relation calculation unit 65 may be, for example, a relational expression between the velocity of the slide 24 and the velocity of the die cushion 20. If possible, the velocity relation calculation unit 65 may calculate a relative velocity between the velocity of the slide 24 and the velocity of the die cushion 20.

Here, in the present invention, the relationship between the velocity of the slide 24 and the velocity of the die cushion 20 is calculated in the velocity relation calculation unit 65 in a manner as described below. The velocities of the slide 24 and the die cushion 20 just before the die cushion 20 and the slide 24 come into collision are denoted by va and vb, respectively, and the velocities of the slide 24 and the die cushion 20 just after having come into collision are denoted by va' and vb', respectively. Here, as described above, the mass of the slide is denoted by Ma and the mass of the die cushion is demoted by Mb.

The following formulas (1) and (2) are derived from the relational expression of the theorem of conservation of momentum and the restitution coefficient.

$$Ma \cdot va' + Mb \cdot vb' = Ma \cdot va + Mb \cdot vb \quad (1)$$

$$vb' - va' = -e \cdot (vb - va) \quad (2)$$

If the velocity va' of the slide 24 just after the collision is eliminated from the formulas (1) and (2), vb'={Ma·(1+e)·va+(Mb−Ma·e)·vb}/(Ma+Mb) is obtained.

Here, in the practical press operation, the power is fed from the first servo motor 38 to the slide 24 via the belt/pulley device 34, and the velocity of the slide 24 just after the collision is the velocity va. Namely, the velocity va of the slide 24 is controlled to be nearly constant. Therefore, the formula (1) based on the theorem of conservation of momentum is expressed by the following formula (3), wherein t is a contacting time.

$$Ma \cdot va + Mb \cdot vb' = Ma \cdot va + Mb \cdot vb + F \cdot t \quad (3)$$

Since F·t is a force necessary for changing the velocity va' of the slide 24 into the velocity va, the following formula (4) is obtained, $$Ma \cdot va' + F \cdot t = Ma \cdot va \quad (4)$$

From the above formulas, the velocity vb' of the die cushion 20 just after the collision remains unchanged as expressed by the above formula.

$$vb' = \{Ma \cdot (1+e) \cdot va + (Mb - Ma \cdot e) \cdot vb\}/(Ma+Mb)$$

Therefore, the relative velocity between the velocity va between the slide 24 and the velocity vb' of the die cushion 20 is expressed by the following formula (5), $$va - vb' = va - \{Ma \cdot (1+e) \cdot va + (Mb - Ma \cdot e) \cdot vb\}/(Ma+Mb) \quad (5)$$

The operation of the die cushion 20 usually closely resembles the operation of the spring, and it may be considered that a spring element is present in the die cushion 20. If the modulus of elasticity of the spring element (not shown) is presumed to be a modulus of elasticity k and if the force acting between the slide 24 and the die cushion 20 is denoted by Fp, the following formula (6) is obtained, $$k \cdot \int (va - vb) dt = Fp \quad (6)$$

In the above formula (6), the integration starts after the collision of the slide 24 with the die cushion 20.

Further, k·(va−vb)=d/dt Fp results from the differentiation of the formula (6). Just after the collision, further, the relation is k·(va−vb')=d/dt Fp. If this relation is substituted for the above formula (5), the following formula (7) is obtained, $$k \cdot (va - \{Ma \cdot (1+e) \cdot va + (Mb - Ma \cdot e) \cdot vb\}/(Ma+Mb)) = d/dt\ Fp \quad (7)$$

Here, the right side "d/dt Fp" of the formula (7) represents the rate of increase or the speed of increase in the force Fp acting between the slide 24 and the die cushion 20. In other words, "d/dt Fp" is a gradient of the force feedback just after the collision of the slide 24 and the die cushion 20. The mass Ma of the slide 24, the mass Mb of the die cushion 20 and the restitution coefficient e are known values. Further, the modulus of elasticity k of the spring element regarded to be present in the die cushion can be calculated in advance through experiment. Therefore, by inputting "d/dt Fp" (hereinafter simply referred to as rate of increase dF), a relationship can be found between the slide velocity va and the die cushion velocity vb as expressed by the formula (7).

On the basis of these matters according to the first embodiment of the present invention, the operator inputs the rate of increase dF through the input unit 66 shown in FIG. 2. Here, however, the operator may input only the force Fp that acts between the slide 24 and the die cushion 20, and the control device 10 may calculate the rate of increase dF from a predetermined collision time. The rate of increase dF that is input or the rate of increase dF that is calculated is fed to the velocity relation calculation unit 65.

The mass Ma of the slide 24, mass Mb of the die cushion 20, restitution coefficient e and modulus of elasticity k stored in the storage unit 64, too, are similarly fed to the velocity relation calculation unit 65. The velocity relation calculation unit 65 finds a relation (or relational expression) between the slide velocity va and the die cushion velocity vb expressed by the above formula (7). This relation (or relational expression) is fed from the velocity relation calculation unit 65 to the die cushion velocity command-forming unit 62.

Here, in the first embodiment, the slide velocity command value Cva which is an instruction value related to the velocity va of the slide is formed by the slide velocity command-forming unit 61 in the control device 10. The slide velocity command value Cva is fed to the first servo motor 38, whereby the slide 24 moves depending upon the slide velocity command value Cva.

As will be understood from FIG. 2, the slide velocity command value Cva is fed to the die cushion velocity command-forming unit 62, too. The die cushion velocity command-forming unit 62 regards the slide velocity command value Cva as the velocity va of the slide, and calculates the die cushion velocity vb from the relation expressed by the formula (7). Next, the die cushion velocity vb in the formula (7) is fed to the second servo motor 18 as the die cushion velocity command value Cvb formed by the die cushion velocity command-forming unit 62. Therefore, the die cushion 20 moves depending upon the die cushion velocity command value Cvb.

That is, the die cushion velocity command value Cvb is formed by using a relation (or relational expression) between the slide velocity va and the die cushion velocity vb. In the present invention, therefore, the die cushion velocity command value Cvb can be formed in an optimum way.

That is, in the first embodiment of the present invention, the operator inputs a desired rate of increase dF in the force F after the collision, "a relation between the slide velocity va and the die cushion velocity vb" necessary for setting the rate of increase dF to be a desired value, is calculated, and an optimum die cushion velocity command value Cvb is formed based on the above relation. As described earlier, too great a relative velocity between the slide velocity va and the die cushion velocity vb becomes a cause of noise and damage to the molds. Conversely, too small a relative velocity results in an insufficient working of the workpiece. In the present invention, on the other hand, since an optimum die cushion velocity command value Cvb is formed from a relation between the slide velocity va and the die cushion velocity vb, it is possible to favorably work the workpiece while suppressing the noise.

The die cushion velocity command value Cvb may be formed without calculating the relation expressed by the formula (7) by the velocity relation calculation unit 65. FIG. 3a is a diagram showing a map of die cushion velocity command values Cvb used in this case. The die cushion velocity command value Cvb shown in FIG. 3a is found in advance as a function of the slide velocity va and the rate of increase dF through experiment, and is stored in the form of a map in the storage unit 64 in the control device 10. The map should satisfy the relation of the formula (7). By using the above map, the die cushion velocity command value Cvb may be directly found from the slide velocity va and the rate of increase dF. In this case, no calculation based on the formula (7) is necessary. Therefore, there is no need to store the mass Ma of the slide 24, mass Mb of the die cushion 20, restitution coefficient e and modulus of elasticity k in the storage unit 64.

Figure 4:
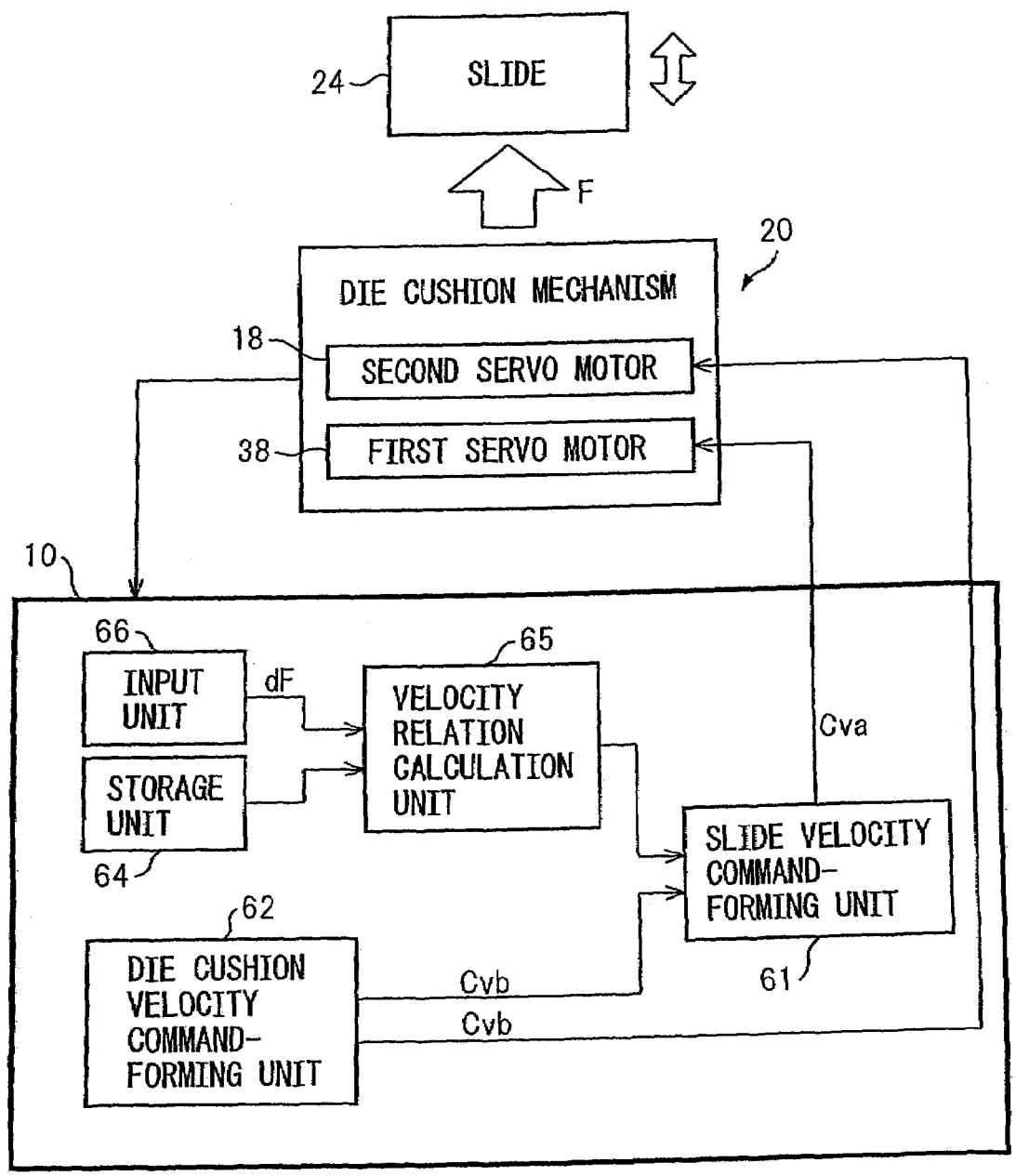
FIG. 4 is a functional block diagram illustrating the control device for the die cushion mechanism according to a second embodiment of the present invention.

FIG. 4 is a functional block diagram illustrating the control device for the die cushion mechanism according to a second embodiment of the present invention. In the second embodiment, an optimum slide velocity command value Cva is found. As described above, though the slide velocity va has been controlled to be nearly constant, there may be a case in which the velocity of the slide 24 should be varied depending on the conditions of the die cushion. The second embodiment and the third embodiment, that will be described later, are used in such cases.

In the second embodiment shown in FIG. 4, a relation based on the formula (7) calculated by the velocity relation calculation unit 65 is fed to the slide velocity command-forming unit 61. The die cushion velocity command-forming portion 62, on the other hand, forms a die cushion velocity command value Cvb and feeds it to both the second servo motor 18 and the slide velocity command-forming unit 61.

The slide velocity command-forming unit 61 regards the die cushion velocity command value Cvb as the velocity vb of the die cushion, and calculates the slide velocity va from the relation expressed by the formula (7). Next, the slide velocity va in the formula (7) is fed to the first servo motor 38 as the slide velocity command value Cva formed by the slide velocity command-forming unit 61. Therefore, the slide 24 moves depending upon the slide velocity command value Cva.

In this case, too, there is formed an optimum slide velocity command value Cva. Therefor, the workpiece can be favorably worked while suppressing the noise as in the above-mentioned first embodiment.

The slide velocity command value Cva may be formed without calculating the relation, expressed by the formula (7), by the velocity relation calculation unit 65, as a matter of course. In this case, reference is made to a map (shown in FIG. 3b) of the slide velocity command values Cva like that of FIG. 3a. By using the above map, the slide velocity command value Cva may be directly found from the die cushion velocity vb and the rate of increase dF.

Figure 5:
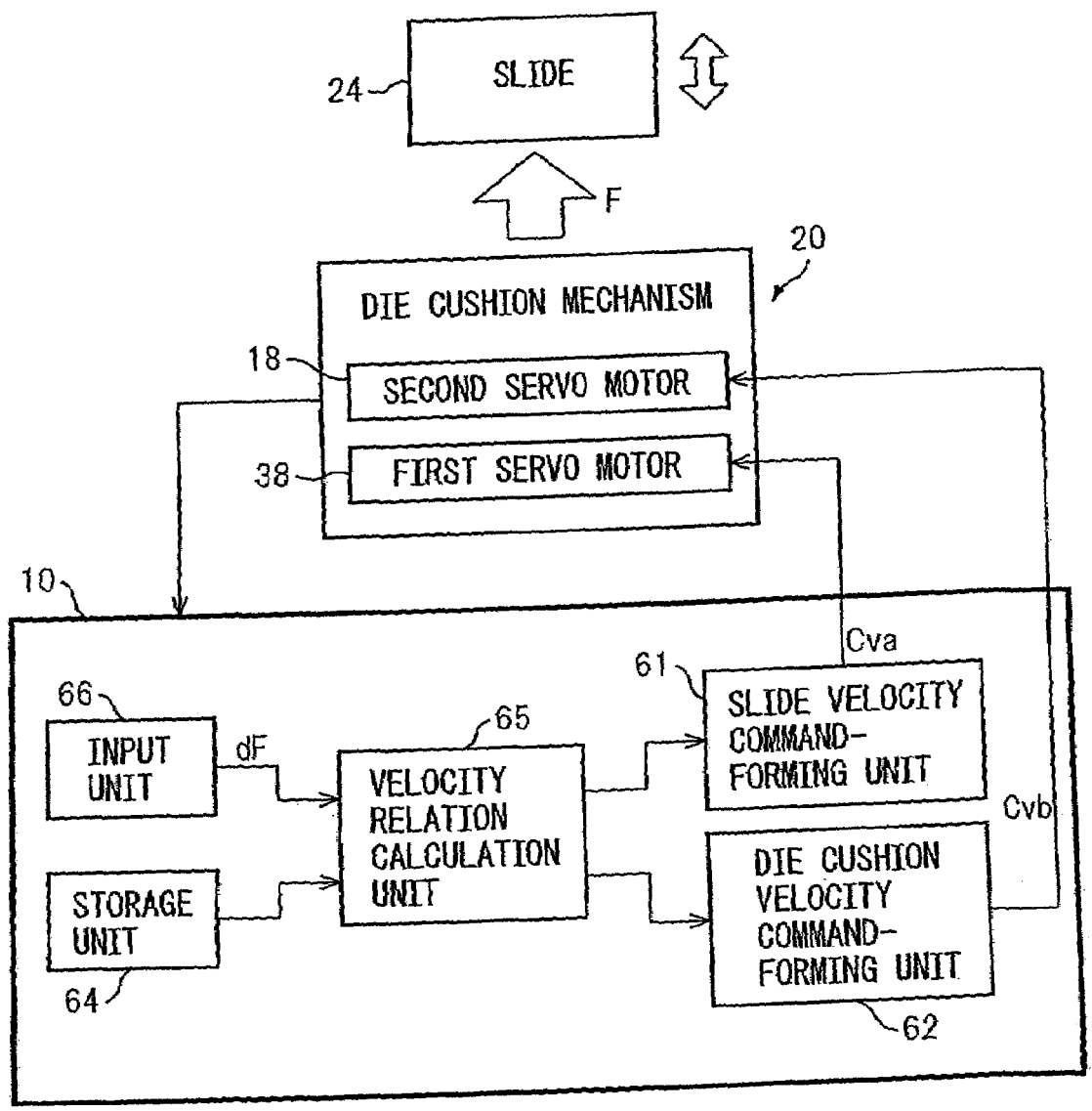
FIG. 5 is a functional block diagram illustrating the control device for the die cushion mechanism according to a third embodiment of the present invention.

FIG. 5 is a functional block diagram illustrating the control device for the die cushion mechanism according to a third embodiment of the present invention. In the third embodiment, the relation expressed by the formula (7) calculated by the velocity relation calculation unit 65 is fed to both the slide velocity command-forming unit 61 and to the die cushion velocity command-forming unit 62.

The slide velocity command-forming unit 61 and the die cushion velocity command-forming unit 62 form the slide velocity command value Cva and the die cushion velocity command value Cvb, respectively, so as to satisfy the relation expressed by the formula (7).

Figure 6:
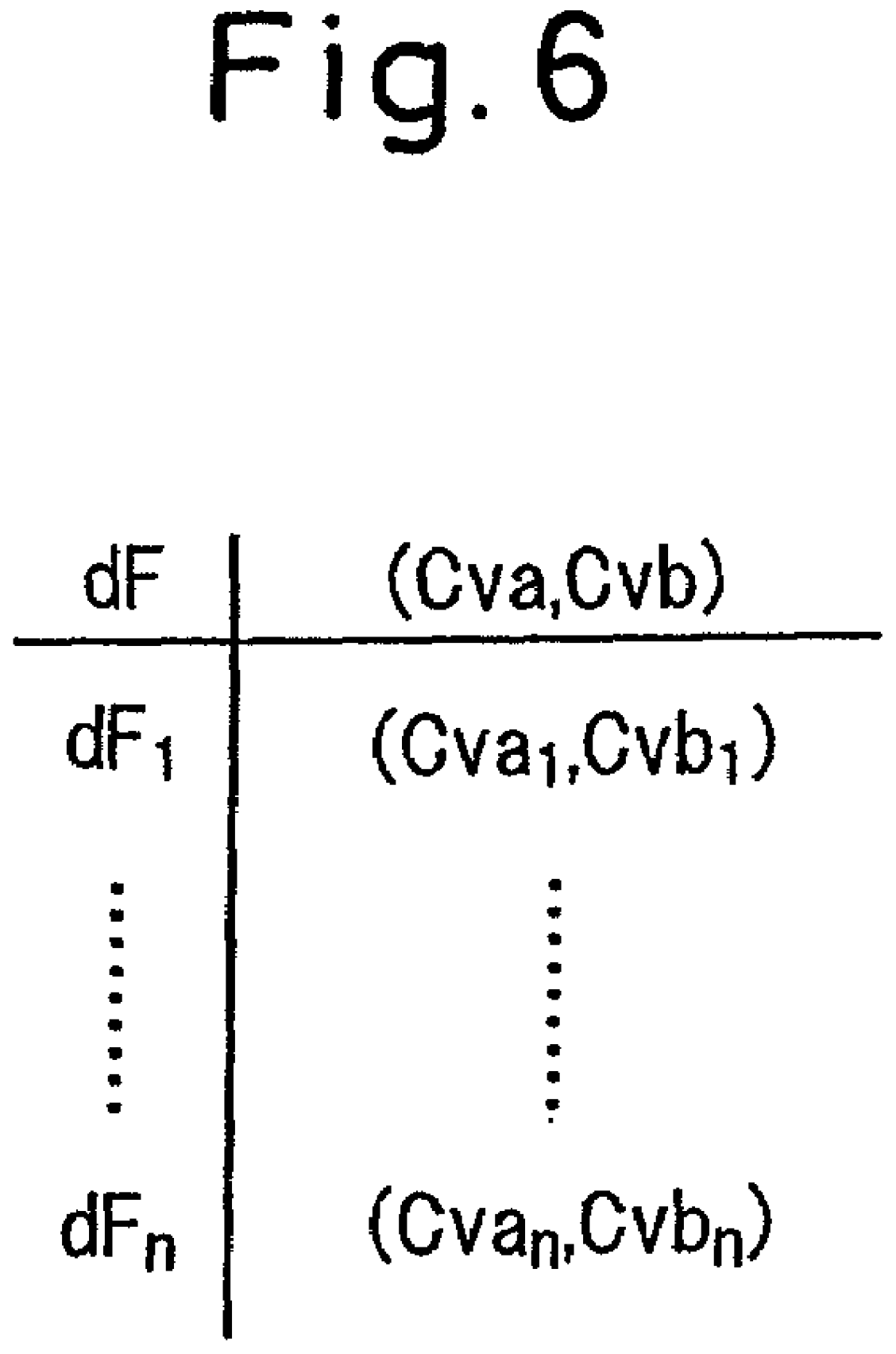

In the third embodiment, too, the slide velocity command value Cva and the die cushion velocity command value Cvb may be formed without calculating the relation expressed by the formula (7) by the velocity relation calculation unit 65. FIG. 6 is a map of slide velocity command values Cva and die cushion velocity command values Cvb which are stored in the storage unit 64. The map of FIG. 6 shows the sets of slide velocity command values Cva and die cushion velocity command values Cvb determined depending upon the rate of increase dF. These sets satisfy the relation expressed by the formula (7). By using the above map, the slide velocity command value Cva and the die cushion velocity command value Cvb may be directly found from the rate of increase dF.

Depending upon the rate of increase dF that is input, there may exist a plurality of sets of slide velocity command values Cva and die cushion velocity command values Cvb. In such a case, any set may be automatically determined by the control device 10 or may be determined by the operator using the input unit 66.

In this case, too, it will be obvious that the workpiece can be favorably worked, relying upon an optimum slide velocity command value Cva and an optimum die cushion velocity command value Cvb, while suppressing noise.

Though the invention was described above by way of typical embodiments, it will be comprehended that a person skilled in the art may further pursue the above-mentioned modifications, various other modifications, omission and addition without departing from the scope of the invention.

The invention claimed is:

1. A control device for a die cushion mechanism that produces a force for a slide in a press machine using servo motors as a drive source, comprising:

slide velocity command-forming means for forming a velocity command for said slide;

die cushion velocity command-forming means for forming a velocity command for said die cushion; and velocity relation calculation means for calculating a velocity relation between the velocity of said slide and the velocity of said die cushion based on a rate of increase in the force produced between said slide and said die cushion immediately after the collision of said slide with said die cushion;

wherein said die cushion velocity command-forming means forms the velocity command for said die cushion based upon the slide velocity command formed by said slide velocity command-forming means and upon said velocity relation calculated by said velocity relation-calculation means.

2. A control device according to claim 1, wherein said velocity relation calculation means calculates said velocity relation by utilizing a restitution coefficient between said slide and said die cushion.

3. A control device according to claim 1, further including input means for inputting the rate of increase in the force produced between said slide and said die cushion.

4. A control device for a die cushion mechanism that produces a force for a slide in a press machine using servo motors as a drive source, comprising:

slide velocity command-forming means for forming a velocity command for said slide;

die cushion velocity command-forming means for forming a velocity command for said die cushion; and velocity relation calculation means for calculating a velocity relation between the velocity of said slide and the velocity of said die cushion based on a rate of increase in the force produced between said slide and said die cushion immediately after the collision of said slide with said die cushion;

wherein said slide velocity command-forming means forms the velocity command for said slide based upon the die cushion velocity command formed by said die cushion velocity command-forming means and upon said velocity relation calculated by said velocity relation-calculation means.

5. A control device for a die cushion mechanism that produces a force for a slide in a press machine using servo motors as a drive source, comprising:

slide velocity command-forming means for forming a velocity command for said slide;

die cushion velocity command-forming means for forming a velocity command for said die cushion; and velocity relation calculation means for calculating a velocity relation between the velocity of said slide and the velocity of said die cushion based on a rate of increase in the force produced between said slide and said die cushion immediately after the collision of said slide with said die cushion;

wherein said slide velocity command-forming means and said die cushion velocity command-forming means, respectively, form the velocity command for said slide and the velocity command for said die cushion based upon said velocity relation calculated by said velocity relation-calculation means.

* * * * *